Dec. 3, 1940.　　　F. L. FOX　　　2,223,723
PHONOGRAPH
Filed June 5, 1937　　　8 Sheets-Sheet 2

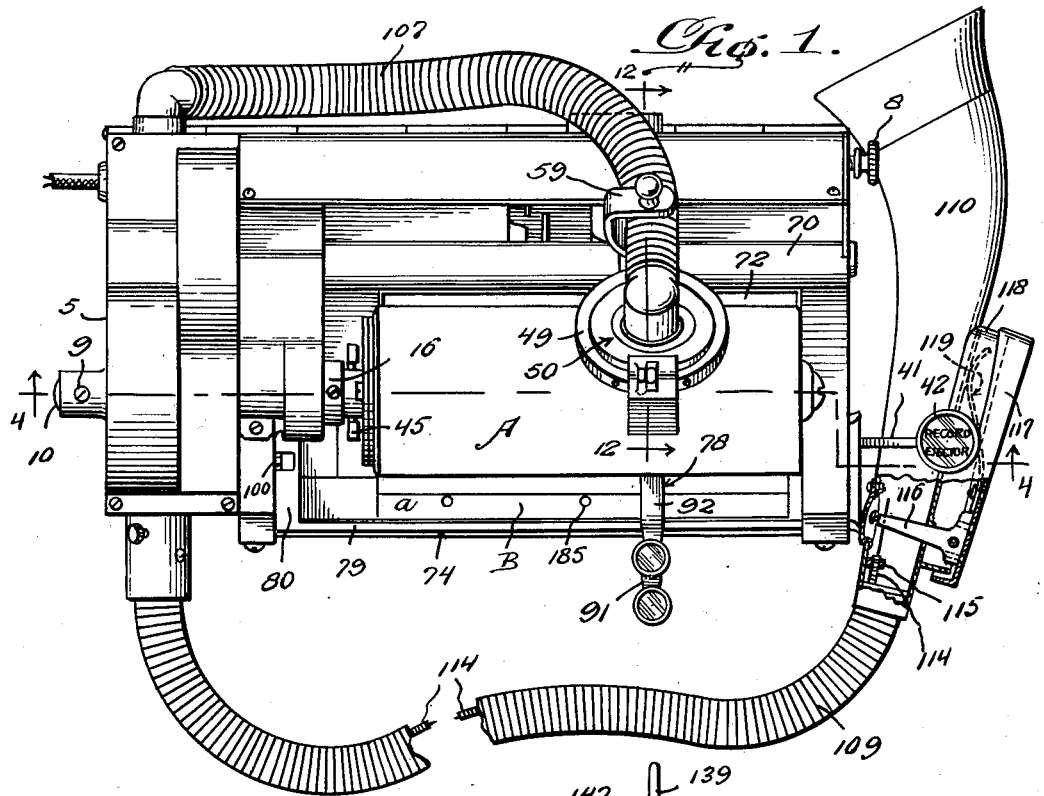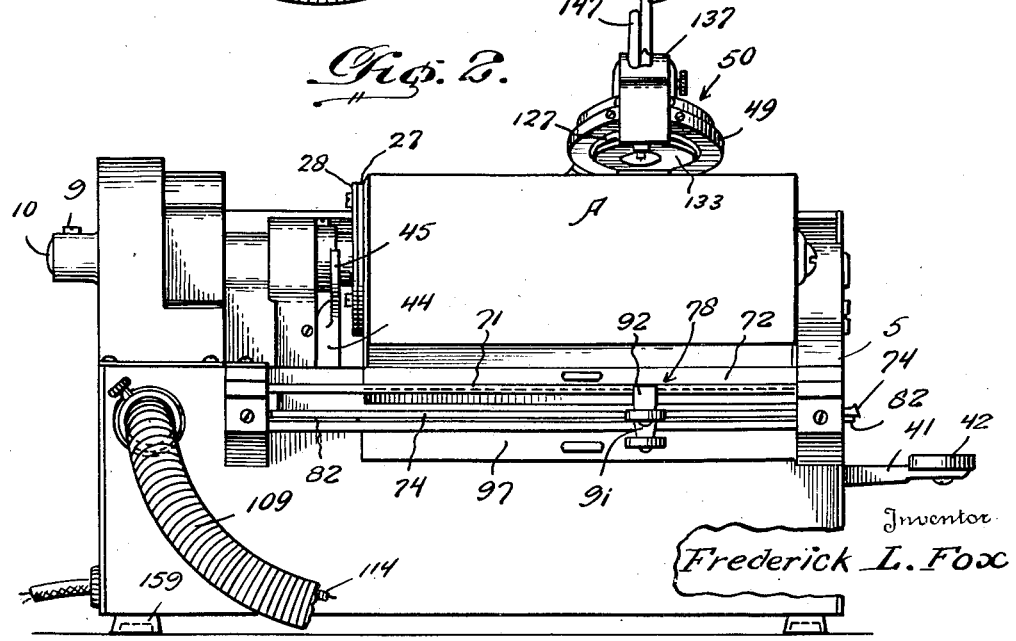

Inventor
Frederick L. Fox,
By J. Stanley Burch
Attorney

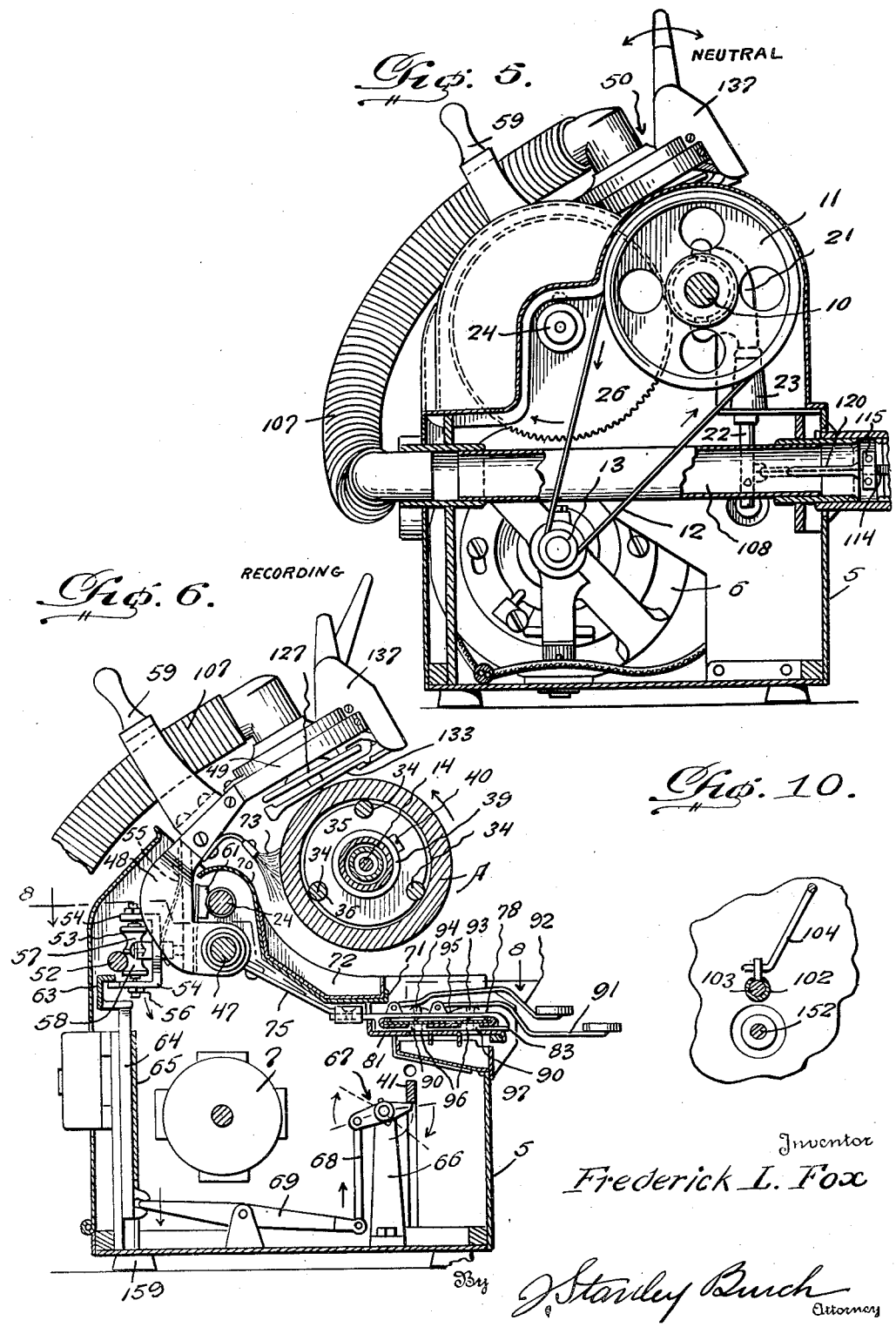

Dec. 3, 1940.  F. L. FOX  2,223,723
PHONOGRAPH
Filed June 5, 1937   8 Sheets-Sheet 4

Inventor
Frederick L. Fox,
By J. Stanley Burch
Attorney

Dec. 3, 1940.   F. L. FOX   2,223,723
PHONOGRAPH
Filed June 5, 1937   8 Sheets-Sheet 5

Inventor
Frederick L Fox,
By J Stanley Burch Attorney

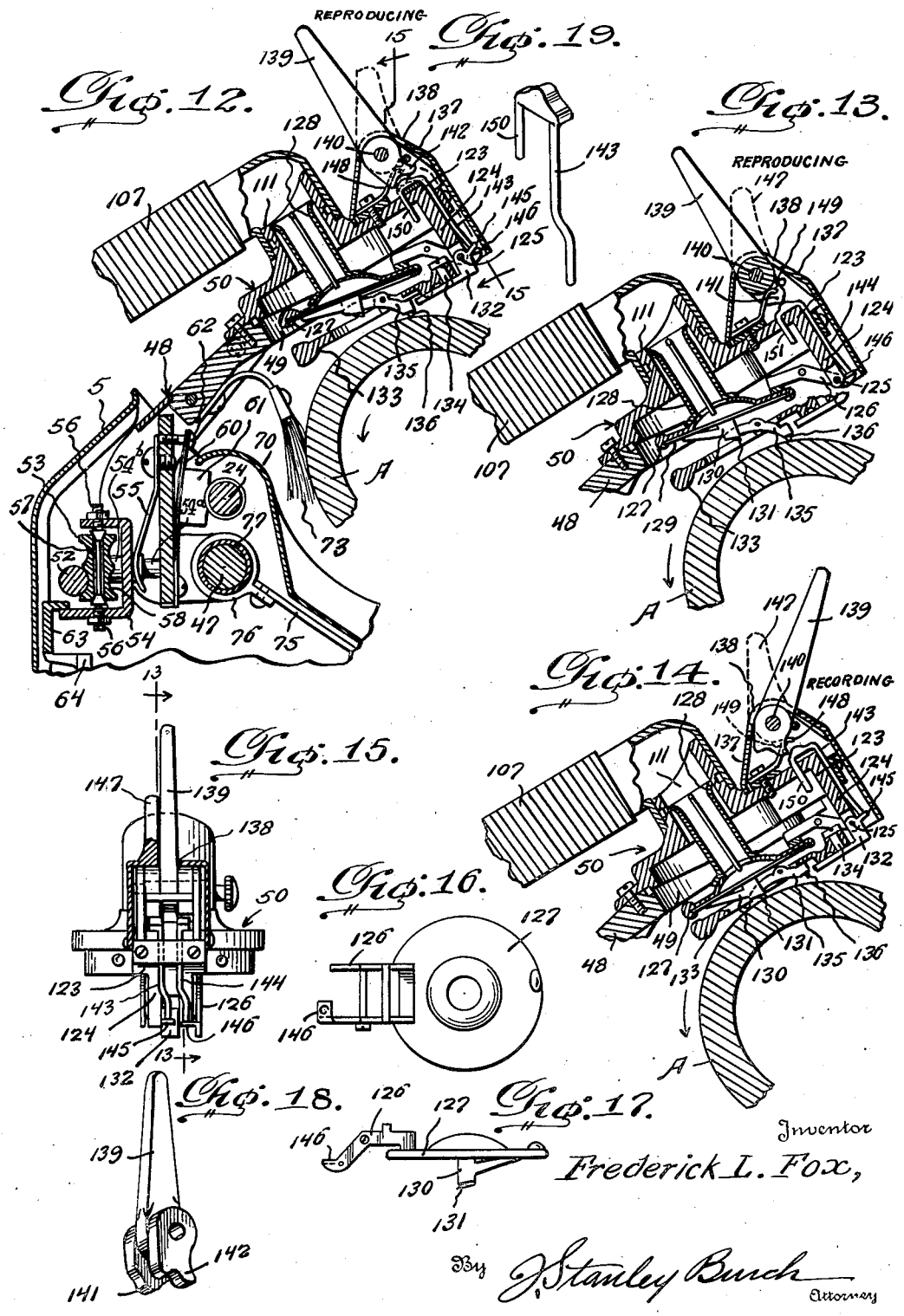

Dec. 3, 1940.   F. L. FOX   2,223,723
PHONOGRAPH
Filed June 5, 1937   8 Sheets-Sheet 7
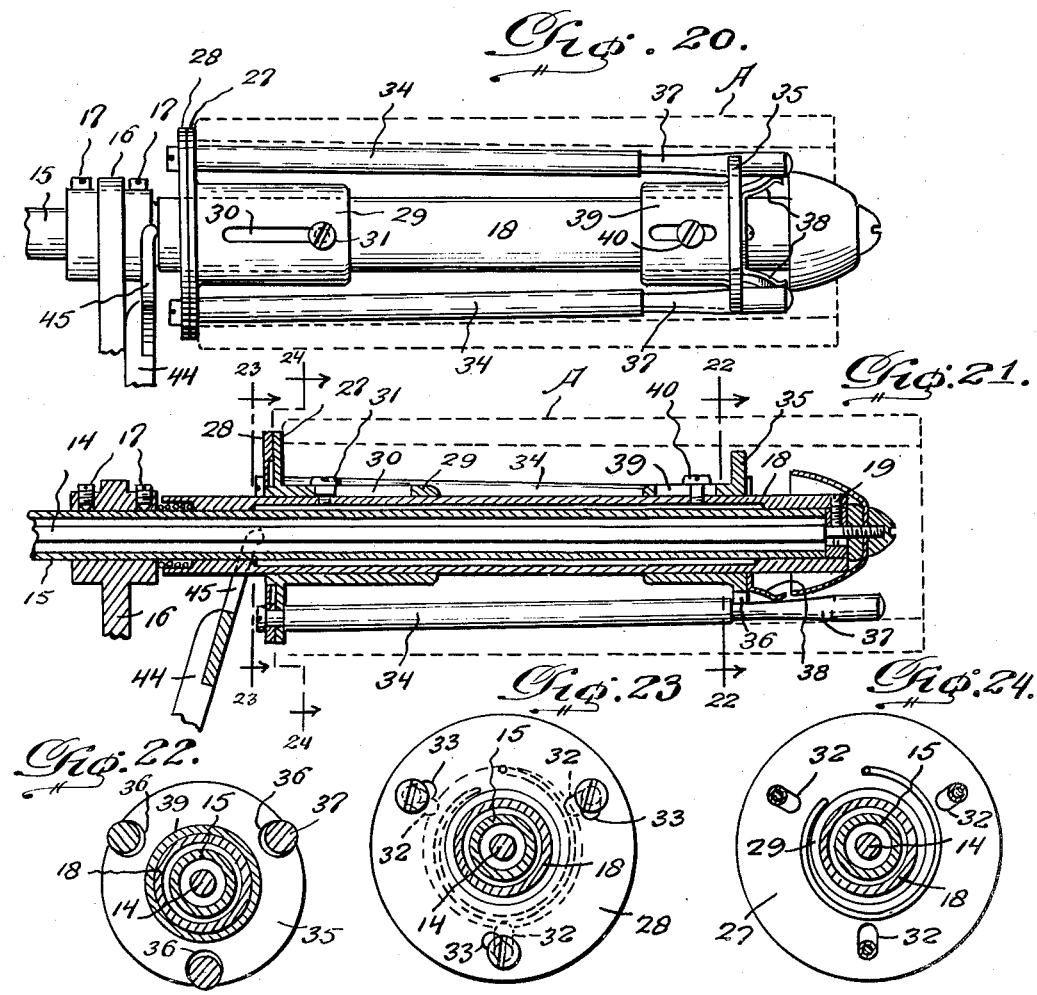
Inventor
Frederick L. Fox,
By J. Stanley Burch
Attorney Dec. 3, 1940.  F. L. FOX  2,223,723
PHONOGRAPH
Filed June 5, 1937    8 Sheets-Sheet 8

INVENTOR
Frederick L. Fox
BY
Blair, Curtis, Dunne & Hayward
ATTORNEYS

Patented Dec. 3, 1940

2,223,723

UNITED STATES PATENT OFFICE 2,223,723

PHONOGRAPH

Frederick L. Fox, Washington, D. C., assignor to Dictaphone Corporation, New York, N. Y., a corporation of New York Application June 5, 1937, Serial No. 146,674

5 Claims. (Cl. 274—17)

This invention relates to phonographs of the business or commercial type, and has particular reference to both a dictating machine for both recording and reproducing dictation and to a transcribing machine for merely reproducing dictation.

An important object of the present invention is to provide a business or commercial phonograph in which there is a minimum difference of construction between the dictating machine and the transcribing machine, mere omission, addition and selective use of a small number of interchangeable parts during manufacture being required to produce the desired kind of machine.

Another object of my invention is to provide a business or commercial phonograph having a novel form and arrangement of parts, and characterized by extreme simplicity and compactness of construction, as well as being efficient in operation and extremely easy to manipulate and control.

Another object of the present invention is to provide an improved combined recorder and reproducer having means mounted directly on the body thereof for shifting the styli to either inoperative, recording or reproducing position, thereby permitting ready production of either a dictating machine or a transcribing machine using identically the same carriage, said carriage having an annular portion capable of selectively receiving either the combined recorder and reproducer or an ordinary reproducer.

Still another object of the present invention is to provide a commercial phonograph having a novel form of sound box carriage tiltable toward or from the sound record to engage the feed nut of the carriage with or disengage it from the feed screw and permit shifting of the carriage to any desired position longitudinally of the record.

Other objects of the present invention are to provide an improved sound box carriage of the above kind having simple and efficent means for releasably retaining the same in either tilted position with the feed nut of said carriage disengaged from the feed screw or with the feed nut engaged with said feed screw.

Still another object of the present invention is to provide manually operable means for both ejecting the record and tilting the sound box carriage so as to disengage its feed nut from the feed screw and to disengage the stylus from the record, the sound box carriage being tilted in advance of the ejection of the record so as to insure disengagement of the stylus from the record upon ejection of the latter, thereby avoiding any possibility of the stylus causing scratching or marring of the record.

The present invention also contemplates a novel memorandum system for commercial phonographs embodying means on the dictating machine for punching openings in a memorandum slip to indicate the approximate positions of instructions given during dictation, and electrical means for signaling the operator of the transcribing machine when such instructions occur, the signaling means being controlled by means of contacts and conducting strips normally held apart by the memorandum slip and permitted to be engaged by the openings punched in the memorandum slip.

A further and very important object of the present invention is to provide a very compact and low-built transcribing machine adapted to be mounted endwise beside a typewriter where the same is conveniently accessible, manually operable means being carried directly by the transcribing machine for starting and stopping the record mandrel and ejecting the record so as to avoid expensive remotely operated means for these purposes. In carrying out this object, conveniently accessible keys are provided at one end of the transcribing machine so as to be adjacent the key board of the typewriter when the transcribing machine is mounted at one side of said typewriter, such keys being provided for actuating the clutch which connects or disconnects the record mandrel to or from its driving motor, and for actuating the record ejector. The machine is so designed and low-built as to not interfere with the movement of the typewriter carriage when the machine is positioned beside the typewriter. Also, the instruction signaling means preferably includes signal lights positioned at the front end of the transcribing machine so as to be clearly visible to the operator of the typewriter and transcribing machine.

With the above general objects in view, and many others that will become apparent as the nature of the present invention is better understood, said invention consists in the novel features and in the novel form, combination and arrangement of parts hereinafter more fully described, shown in the accompanying drawings and claimed.

In the drawings, wherein like reference characters indicate similar parts throughout the several views, Figure 1 is a top plan view of a dictating machine constructed in accordance with the present invention, parts being broken away and in section.

Figure 2 is a front elevational view thereof, partly broken away and with parts removed.

Fig. 5 is a vertical transverse section on line 5—5 of Figure 4.

Figure 6 is a vertical transverse section on line 6—6 of Figure 4.

Figure 10 is an enlarged fragmentary section on line 10—10 of Figure 8.

Figure 12 is an enlarged section on line 12—12 of Figure 1.

Figure 13 is a fragmentary section showing a portion of the construction illustrated in Figure 12, but taken on a different plane indicated by the line 13—13 in Figure 15.

Figure 14 is a view similar to Figure 13 with the parts shifted to recording position from the reproducing position of Figures 12 and 13.

Figure 15 is a section on line 15—15 of Figure 12.

Figure 16 is a plan view of the diaphragm carrier forming part of the construction shown in Figure 12.

Figure 17 is an edge elevational view thereof.

Figure 18 is an enlarged perspective view of the cam lever forming part of the construction shown in Figure 12 and adapted to be manipulated to shift the styli from an inoperative to either a recording or reproducing position.

Figure 19 is an enlarged perspective view of one of the rods actuated by the lever of Figure 18 for shifting the styli of the recorder and reproducer shown in Figure 12.

Figure 20 is a fragmentary view illustrating in elevation the improved record mandrel forming part of the present phonograph.

Figure 21 is a view of the construction shown in Figure 20, in central longitudinal section.

Figure 22 is a transverse section on line 22—22 of Figure 21.

Figure 23 is a similar view on line 23—23 of Figure 21.

Figure 24 is another similar view on line 24—24 of Figure 21.

Figure 3:
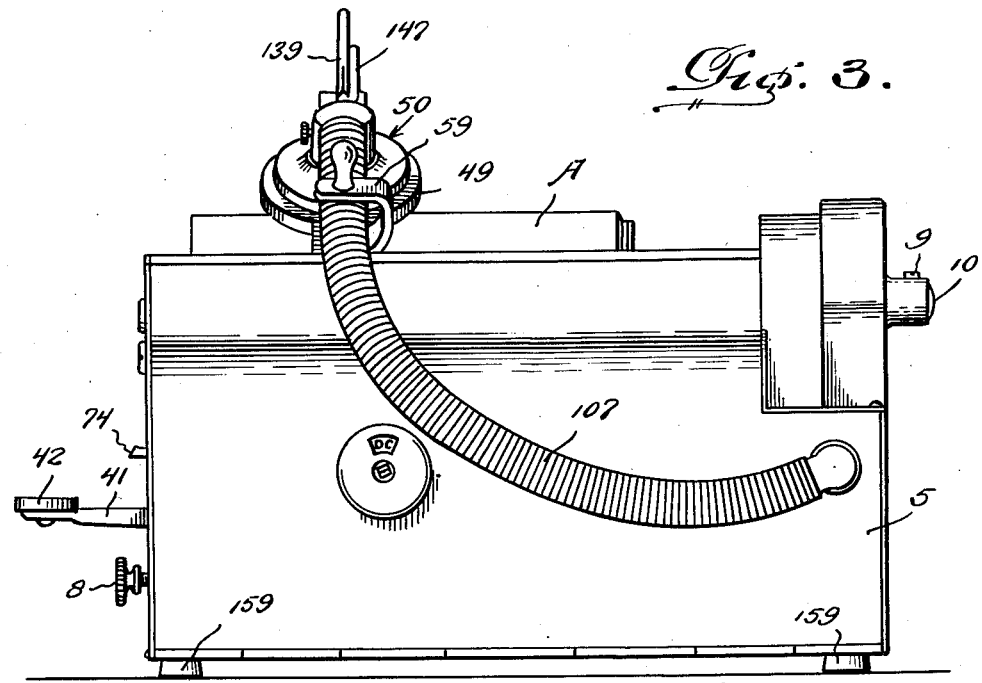
Figure 3 is a rear elevational view of the same.
Figure 4:
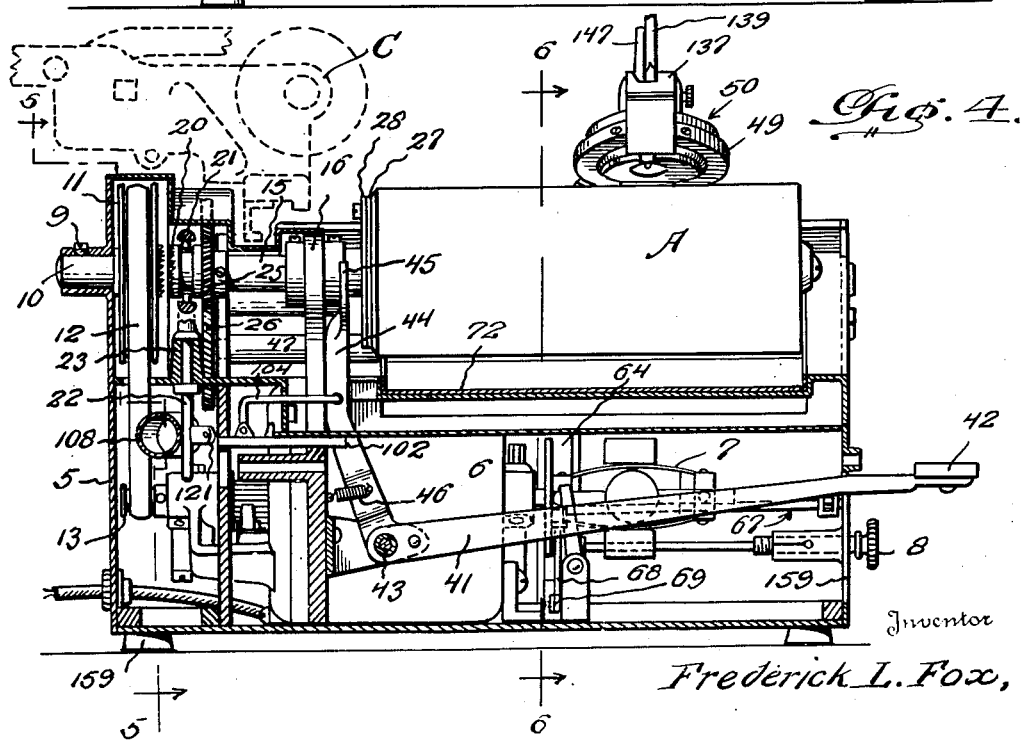
Fig. 4 is a vertical longitudinal section on line 4—4 of Figure 1.

Referring in detail to the drawings, the present phonograph includes a suitable casing 5 within the rear lower portion of which is mounted an electric motor 6 having the usual speed governor 7 provided with regulating means including an operating knob 8 disposed outside the casing 5 at one end of the latter. Secured in the other end of casing 5 by means of a set screw 9 or the like is a stub shaft 10 on which is rotatably mounted a pulley 11 operatively connected with the power shaft of motor 6 by means of an endless driving belt 12 passing around said pulley 11 and a smaller pulley 13 secured on said power shaft of motor 6. The shaft 10 is axially alined with the driving shaft 14 of a record support or mandrel, and this record support or mandrel is of the type generally disclosed in the U. S. patent to N. H. Holland No. 1,213,197 dated January 23, 1917. Also, the means for transmitting the drive from pulley 11 to shaft 14 is similar to that disclosed in this patent. As shown more clearly in Figures 20 and 21, a stationary tube or sleeve 15 is supported at one end in a standard 16 and rigidly secured in position by set screws 17 or the like. The driving shaft 14 is mounted to extend through the tube 15, and is secured at its outer or right hand end to the corresponding end of a tubular shaft 18 by means of a set screw 19 or the like, said tubular shaft 18 forming part of the record mandrel or support proper and being rotatably mounted upon the tube 15. Thus, the tubular shaft 18 will rotate with the driving shaft 14 which is adapted to be connected to pulley 11 by means of a clutch 20 slidably keyed upon an enlarged portion of driving shaft 14 and controlled or operated by means including the usual clutch shifting fork 21 loosely engaging the clutch 20 and carried on the upper end of a vertical shaft 22 journaled in a suitable bearing 23. Rotatably mounted rearwardly of the record support or mandrel and parallel with its driving shaft 14 is the usual feed screw 24 for the sound box carriage of the phonograph, and this feed screw is driven in the usual manner by means of a pinion 25 secured on the mandrel driving shaft 14 and meshing with a larger gear 26 secured on the adjacent end portion of the feed screw 24.

Referring again to Figures 20 and 21, the present record support or mandrel is of special improved construction to provide for ready ejection and release of the record when desired. As shown, this record support or mandrel includes the usual pair of adjacent disks 27 and 28 mounted on the tubular shaft 18, the disks 27 and 28 being slidable longitudinally of shaft 18 instead of being secured thereto in the usual manner. For this purpose, the disk 27 has a hub 29 provided with a longitudinal slot 30 through which passes a screw 31 threaded into the shaft 18. The screw 31 does not interfere with the sliding movement of disks 27 and 28 but properly limits the degree of sliding movement permitted said disks in either direction. As usual, the disks 27 and 28 are of the same diameter and are resiliently connected by means of a spiral spring as disclosed in the above-mentioned Holland patent. Also, the disk 27 has the usual slots 32, while the disk 28 has the usual slots 33 cooperating therewith. The record mandrel or support also includes the usual rods 34 extending longitudinally of shaft 18 and adapted to engage the bore of a cylindrical phonograph record A. The rods 34 are arranged and connected with the disks 27 and 28 exactly as set forth in the above-mentioned Holland patent, and a further disk 35 is mounted on the shaft 18 and provided with the spaced openings 36, as is also usual. The rods 34 have the usual tapered ends 37 engaged in the openings 36 of disk 35 so as to cause radial movement of the outer ends of rods 34 upon relative shifting of the rods 34 and disks 27 and 28 axially of the record support. The main difference between the present record support or mandrel and that disclosed in the Holland patent mentioned above is that in the present instance the disk 35 is secured in a stationary position upon the shaft 18 and the disks 27 and 28 and rods 34 are movable longitudinally of said shaft 18, whereas in the patent mentioned the disk 35 is movable and adapted to be actuated by hand in opposition to a spring, the disks 27 and 28 and rods 34 being secured against movement longitudinally of the shaft 18. With the present construction, movement of disks 27 and 28 outwardly will cause ejection of the record A abutting the disk 27, and the rods 34 will be simultaneously contracted at their outer ends to release their grip upon the bore of the record. Also, when the record A is placed on the record support no resistance is offered thereto when the rods 34 are contracted and slid outwardly with the disks 27 and 28. However, as soon as the record abuts the disk 27 it will cause the disks 27 and 28 and rods 34 to be shifted to their inner limit of movement, the rods 34 being simultaneously expanded at their outer ends into engagement with the bore of the record for securely holding the latter in place on the record support or mandrel. With this construction, the record is readily shifted outwardly and simultaneously released for convenient and ready removal from the record support or mandrel, and the mere placing of the record on the mandrel and forcing of said record to the left effects return of the mandrel parts to proper normal position as well as gripping engagement of the mandrel with the bore of the record. No operation of a separate manual releasing member is necessary, and the construction of the mandrel is greatly simplified while the record may be applied or removed with respect to the mandrel with much greater facility and ease. Another important feature of the present record support is that the openings 36 of disk 35 are relatively deeper than usual, and outward pressure and movement is imparted to the outer ends of rods 34 by springs 38 carried by said disk 35 at the inner sides of the rods 34. Thus, when the outer ends of the rods 34 are expanded by shifting said rods and the disks 27 and 28 to the left of Figure 21, the outer ends of rods 34 are still yieldable inwardly so as to provide a yieldable rather than a positive grip. In this way the breaking of cylinders due to excess outward pressure is eliminated. The disk 35 preferably has a longitudinally slotted hub as at 39 and a screw 40 preferably passes through this slot and is threaded into the shaft 18 to facilitate proper adjustment of the disk 35 with respect to disks 27 and 28 and thereby secure a proper setting of disk 35 in relation to the tapered ends 37 of rods 34. When properly set or adjusted, the disk 35 is firmly secured in that position by tightening the screw 40.

It will be seen that the above described record support or mandrel lends itself admirably to the use of a manually operable means for shifting the disks 27 and 28 and rods 34 outwardly or to the right of Figure 21 to effect ejection and release of the record. I provide such a means consisting of a bell crank lever having an arm 41 extended through the right hand end of casing 5 and provided on its outwardly projecting end with a suitably labeled key or finger piece 42, said bell crank lever being pivoted for vertical rocking movement as at 43 and having an upwardly projecting arm 44 forked at its upper end as at 45 to straddle the mandrel shaft 18 and to engage disk 28 upon depression of arm 41 so as to effect the shifting of disks 27 and 28 and rods 34 outwardly or to the right as before mentioned. This key-operated lever for ejecting and releasing the record on the mandrel is very simple and durable in construction, efficient in operation and readily accessible. Suitable means such as a tension spring 46 is provided to return the bell crank lever composed of arms 41 and 44, to normal position as soon as the finger piece or key 42 is released. This will of course position the forked end 45 away from the disk 28 so that the disks 27 and 28 and rods 34 may be readily shifted back to their normal positions or to the left of Figure 21 to the position of Figure 20 upon mere placing of a record on the record support and movement of said record to the left. It might also be noted that the forked end 45 of lever arm 44 is normally in spaced relation to the disk 28 so that some movement is permitted arm 44 before the forked end 45 engages disk 28 and begins shifting the parts 27, 28 and 34 of the record mandrel in the direction to eject and release the record. The purpose of this lost motion between the forked end 45 of lever arm 44 and the movable parts of the record support will be later explained.

Figure 25:
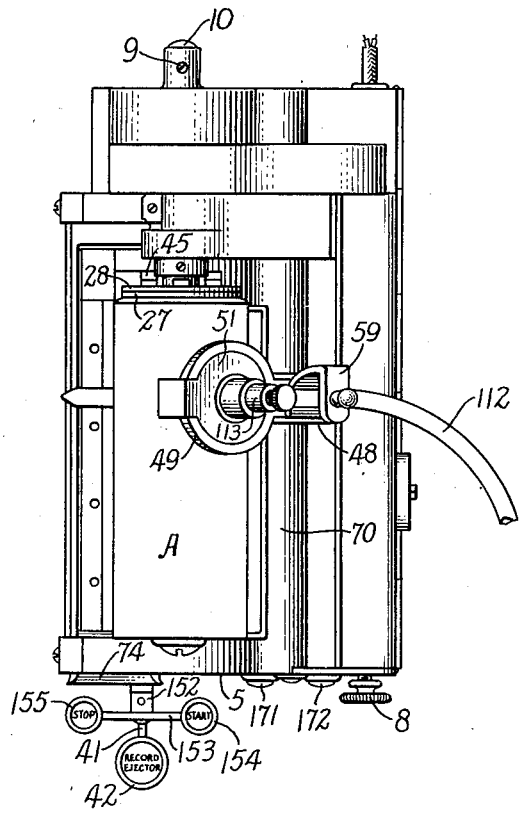
Figure 25 is a plan view showing a transcribing machine constructed in accordance with the present invention and operatively mounted beside a typewriter.
Figure 26:
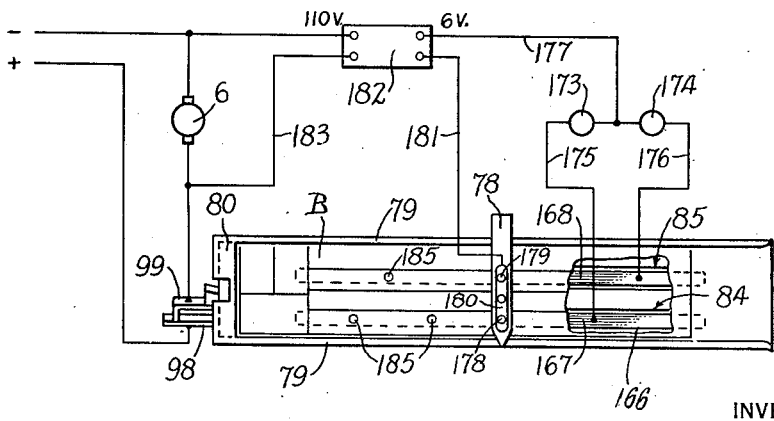
Figure 26 is a diagrammatic plan view, partly broken away, showing a wiring diagram for the transcribing machine and illustrating the manner in which the instruction slip controls the engagement of contacts which control the signal lights.

Rigidly mounted in the casing 5 directly beneath the feed screw 24 is a longitudinal guide rod 47, and pivotally and slidably mounted upon this guide rod 47, at its lower end, is a sound box carriage 48 consisting of a goose-neck arm having a substantially annular upper end portion 49 in which is removably mounted a sound box which may consist of a combined recorder and reproducer 50 as shown in connection with the dictating machine of Figures 1 to 19 inclusive, or a simple reproducer 51 as shown in connection with the transcribing machine of Figures 25 and 26. The sound box carriage 48 is thus mounted on the guide rod 47 for movement longitudinally of the record A carried by the record support or mandrel, as well as being tiltable forwardly or backwardly to bring the sound box into or out of operative relation to said record, respectively. As shown more clearly in Figures 6 to 8 inclusive and 12, the carriage 48 extends rearwardly from the guide rod 47 then upwardly behind the feed screw 24, and then upwardly and forwardly so that the substantially circular portion 49 carrying the sound box overlies the rear upper portion of the record A. As is also shown in these figures, a second longitudinal guide rod 52 is mounted in the casing 5 rearwardly of guide rod 47 and behind the carriage 48, said guide rod 52 being engaged by a guide roller 53 having a mount 54 including a bracket slidably mounted on rods 54a and yieldingly urged rearwardly toward the guide rod 52 by a spring 55. The rods 54a are fixed to and project rearwardly from a rigid part of carriage 48, and the bracket of mount 54 has rigid side sleeves 54b slidably fitted on the rods 54a. The roller 53 is vertically disposed or journaled upon a vertical axis in the bracket of mount 54 by means generally indicated at 56 which provide for slight vertical adjustment of said roller 53, so that the carriage may be set to have proper operative relation between the sound box and the record when the carriage is in forwardly tilted position. This will be fully understood and appreciated in view of the fact that the roller 53 has spaced upper and lower guide grooves 57 and 58, respectively, for reception of the guide rod 52. The guide rod 52 will of course engage the lower groove 58 when the carriage is in forwardly tilted position, while rearward tilting of carriage 48 will result in downward movement of roller 53 until guide rod 52 engages the upper groove 57 of roller 53. The roller 53 and its mount 54 will of course yield forwardly to permit passage of the rod 52 from one groove to the other, the pressure of the roller 53 against rod 52 acting to insure maintenance of the carriage 58 in either of its forwardly or rearwardly tilted positions. It is noted that the rearward movement of roller 53 under the influence of spring 55 is properly adjustably limited so as to limit the frictional engagement of roller 53 with rod 52 and thereby permit the necessary freedom of movement of the carriage longitudinally of the guide rods 47 and 52. In connection with a transcribing machine, the carriage 48 may be tilted about the axis of guide rod 47 by simply grasping the carriage, but the dictating machine preferably has a suitable handle 59 for use in more conveniently tilting the sound box carriage.

Attached to the front of the lower end portion of carriage 48 is the lower end of a spring 60 whose upper end is tensioned forwardly and carries a nut member 61 engaging the feed screw 24 so as to cause movement of the carriage longitudinally of the record upon rotation of said feed screw 24. The forward movement of the upper end of spring 60 and the forward movement of nut member 61 carried thereby is adjustably limited by a screw 62 or the like so as to properly limit the frictional engagement of nut member 61 with feed screw 24 and thereby prevent undue binding between these relatively movable parts. Also, this insures disengagement of nut member 61 from feed screw 24 when the carriage 48 is tilted rearwardly to disengage the stylus of the sound box from the record, thereby permitting free manual movement of the carriage longitudinally of the record as required for resetting the carriage at the beginning of a new record or for back spacing when desiring to listen again to a desired portion of the record on the record support or mandrel. It will be noted that the guide rods 47 and 52 are both located, together with the feed screw 24, rearwardly of and below the top of the record, as well as within the rear upper portion of the casing, so as to be entirely encased and out of the way. Of course, the mere forward tilting of the carriage 48 to bring the sound box into operative relation with the record on the mandrel results in engagement of nut member 61 with feed screw 24 so that movement will be imparted to the carriage as soon as the feed screw 24 is driven by engagement of clutch member 20 with pulley 11 for also driving the record support or mandrel.

Means is provided for rearwardly tilting the carriage 48 and thereby disengaging the stylus of the sound box from the record upon operation of lever arm 44 and in advance of ejection and release of record A through the medium of lever arm 44 and its forked end 45. By way of example, I have illustrated a means suitable for this purpose as including a horizontal bar 63 carried by the upper end of a rod 64 slidable in a guide 65 and the rear lower portion of casing 5, said bar 63 extending a distance corresponding to the length of movement of the carriage 48 and having a flange overlying the lower leg of mount 54 as shown clearly in Figures 6, 7 and 12. Pivoted intermediate its ends upon a support 66 beside the lever arm 44 is a rocking lever 67 operatively connected to the lower end of rod 64 by means of a link 68 and lever 69. The arrangement is such that upon initial depression of lever arm 44 the lever 67 will be rocked so as to lower bar 63 through the connections described and thereby pull downwardly on mount 54 so as to tilt the carriage 48 rearwardly. While this takes place, the forked end 45 of lever arm 44 merely moves from the position of Figure 4 to a position where it initially engages with the disk 28 of the record support or mandrel, no movement having yet been imparted to said disk 28 and disk 27 or rods 34 to cause ejection or release of the record. Further depressing movement of lever arm 44 causes it to pass the adjacent end of lever 67 so that downward movement of bar 63 ceases at the proper time after the carriage 48 has been rearwardly tilted, such further movement of lever arm 44 then acting to move the disks 27 and 28 and rods 34 of the mandrel outwardly or to the right for effecting ejection and release of the record as previously explained. This results in disengagement of the sound box stylus from the record before ejection of the latter, thereby preventing damaging of the stylus and connected parts of the sound box, as well as prevent scratching or marring of the record by said stylus. It is noted that the bar 63 will remain lowered so that lever arm 44 will pass above the adjacent end of lever 67 as soon as it is released and returned to normal position by spring 46. The bar 63 and connected parts 64, 69, 68 and 67 will be returned to normal position when the carriage 48 is manually tilted forwardly, the mounting 54 acting to elevate bar 63 at this time.

The casing 5 has a top wall whose rear portion 70 overlies the feed screw 24 and then extends downwardly in front of said feed screw and the guide rod 47, and whose forward portion extends downwardly and then forwardly under the record support or mandrel where it terminates rearwardly of the front wall of casing 5 in a flange 71. This forward portion of the top wall of casing 5 thus provides a recess beneath the record support for removable reception of a pan 72 arranged to receive and collect the cuttings removed from the record during recordation, such cuttings being removed from the record by an ordinary brush 73 attached to the carriage 48. Mounted in the space between the front edge of the top wall of casing 5 and the front wall of said casing, as well as at a level below said top wall, is a memorandum slip holder 74. Also, an arm 75 is carried by a sleeve 76 loosely fitted on the hub 77 of carriage 48 which pivotally and slidably surrounds guide rod 47. This arrangement permits turning of hub 77 on guide rod 47 without turning sleeve 76 or causing vertical movement of arm 75. Attached to the forward end of arm 75 is an indicator 78 which extends across the top of the memorandum slip holder 74 in substantially the same vertical plane as the stylus of the sound box carried by carriage 48. It will be seen that arm 75 extends beneath the top wall of casing 5, and the indicator bar 78 extends across the memorandum slip holder 74 at a level below said top wall and forwardly of the latter. Thus, these parts are not disposed directly in front of the record, but are disposed below said record and below the pan 72. The sound grooves formed in the record by recordation are therefore clearly visible, and the memorandum slip holder and indicator bar interfere in no way with removal of the pan 72 or access to the record cylinder. This desirable arrangement is even further enhanced by reason of the fact that the sound box is supported by the sound box carriage over the rear upper portion of the record instead of over the forward upper portion of the record and no guide rod for the sound box carriage is positioned directly above the record support or mandrel. In the embodiment of the present invention herein illustrated, the indicator bar 78 of the dictating machine may form part of a punching device for punching openings in a memorandum slip arranged in the holder 74 wherever instructions are given during dictation.

The memorandum slip holder 74 is similar in both the dictating and transcribing machines, and consists of a plate provided along its longitudinal edges with inwardly directed flanges 79, and along its inner transverse edge with a relatively wider inwardly directed flange 80, said flanges serving to retain a memorandum slip B in position on the plate as shown in several of the figures. This memorandum slip holder 74 is secured upon a base plate 81 by means of screws 81' or the like, and in the dictating machine suitable fibre or like spacing plates 82 are interposed between the ends of the holder 74 and the base plate 81 as shown clearly in Figure 9. The space between the spacer plates 82 is as great as the distance of travel of the indicator bar 78 and permits of free movement of a further bar 83 in the space between the holder 74 and base plate 81, said bar 83 being attached to and parallel with the indicator bar 78. The plate of holder 74 is provided with spaced longitudinal slots 84 and 85 as shown clearly in Figures 6, 8 and 9, and the bar 83 has spaced upstanding apertured bosses as at 90 projecting into and movable along said slots 84 and 85 and constituting the female members of punches including pivoted keys or levers 91 and 92 carried by the indicator bar 78 and having punch pins 93 and 94 respectively. The keys or levers 91 and 92 are normally yieldingly elevated by spring means 95 which also normally elevates the punch pins 93 and 94 slidable in openings provided in the indicator bar 78. Thus, upon depression of lever or key 91 the punch pin 93 will be depressed so as to punch an opening or hole in the memorandum slip B, the portion of the slip removed by punching being forced through the associated boss 90. Similarly, upon depression of lever or key 92, the pin 94 will be forced through the memorandum slip into the boss 90 associated therewith, thereby punching a hole in the memorandum slip in a different plane longitudinally of the latter. In order to allow the punchings to pass through the base plate 81, the latter is provided with longitudinal slots 96 alined with the slots 84 and 85 in the slip holder 74. The dictating machine has a removable drawer 97 below the base plate 81 for reception of these punchings. Memorandum slip B is of a generally well known type having indicating spaces extending longitudinally thereof, two spaced ones of which indicated at *a* and *b* are adapted to be utilized to indicate corrections where they occur or to indicate the end of a particular letter or the like which has been dictated. These things are indicated in connection with the present dictating machine by punching holes at the desired points in the spaces *a* and *b* by use of the punches 93 and 94, respectively, it being of course understood that the punches including the bar 78 and bar 83 are fed along the memorandum slip at a rate equal to the movement of the recorder and reproducer across the record surface. These instructions are noted by punching holes in the correction slip so that said holes may be used to control the operation of warning signals when the memorandum slip is used later on in the transcribing machine and in connection with the particular record on which said instructions were dictated or to which they apply.

Interposed in the circuit of motor 6 which drives the record mandrel and the feed screw for the carriage, is a normally open switch including spaced contacts 98 and 99. The contact 99 has an upstanding lug 100 which is beveled at the top and normally projects upwardly through a longitudinal slot provided in the adjacent left hand end of the holder 74. The arrangement is such that when no correction slip is arranged in the holder 74, the contact 99 will disengage from the contact 98 and thereby render the motor 6 inoperative. On the other hand, when a correction slip is inserted in the holder 74 the left hand end thereof will engage the lug 100 so as to depress the latter and cause engagement of contact 99 with contact 98 so as to throw the motor 6 into operation. As the flange 80 of the holder 74 is relatively wide, it will guide the end of the correction slip into engagement with the beveled top of lug 100 and maintain this end of the correction slip against upward deflection. The contact 99 has sufficient tension to cause the adjacent end of the correction slip to be firmly gripped between the lug 100 and the flange 80 so that any friction between the correction slip and the punching device will not cause the correction slip to slide from its proper operative position within the holder. In other words, the bars 78 and 83 with their associated parts will not cause sufficient drag on the correction slip as to cause it to travel to the right with the sound box carriage, when the left hand end of said correction slip is properly engaged and gripped between the lug 100 and flange 80. It will thus be seen that it is necessary to insert a correction slip in the holder 74 in order to render the motor 6 operative, while the mere removal of said correction slip will cause the motor 6 to be inoperative. Of course, complete removal of the correction slip is unnecessary for this purpose, partial removal thereof to a position wherein the left hand end of the correction slip is disengaged from between the lug 100 and the flange 80 being sufficient to permit release of lug 100 and disengagement of contact 99 from contact 98. Naturally, complete insertion of the correction slip is required to render the motor 6 operative, thereby insuring proper relation between the correction slip and the punching device when the machine is used for dictation.

I provide for causing partial ejection of the correction slip whenever the lever arm 41 is depressed to render the sound box inoperative and to eject and release the record. For this purpose, I mount a longitudinally slotted tubular guide 102 adjacent the left hand end of holder 74, and arranged within this guide is a plunger or sliding rod 103 operatively connected to the lever arm 44 by means of a link 104, the plunger or rod 103 having an upstanding lug 105 arranged to enter a longitudinal slot 106 provided in the plate member of holder 74 beneath the flange 80 as shown more clearly in Figure 31. Thus, when lever 41 is depressed, plunger 103 is slid to the right and lug 105, engaging the adjacent left hand end of slip B, will cause the latter to be moved to the right and thereby partially ejected from holder 74, simultaneously with the operation of rendering the sound box inoperative and ejecting and releasing the record A. The slip B is partially ejected for a distance sufficient to disengage the slip from lug 100 so that the motor 6 is simultaneously rendered inoperative. The same construction and operation is provided in connection with the transcribing machine, the ejection of the slip occurring simultaneously with rendering the reproducer of said transcribing machine inoperative and simultaneously with ejection and release of the record on the mandrel of said transcribing machine.

The dictating machine has a novel and improved speaker tube construction consisting of a flexible section 107, a rigid section 108 and a second flexible section 109 provided at its outer end with the usual mouthpiece 110. The rigid section 108 extends transversely through the casing 5 at the left hand end of the latter, and the flexible section 107 couples the sound outlet neck 111 of the combined recorder and reproducer with the rear end of said rigid section 108 at the back of the machine. The other flexible section 109 is coupled at its inner end to the forward end of rigid section 108 at the front of the machine. Thus, the sound recorder and reproducer as well as its carriage are relieved of much of the weight of the speaker tube comprising section 109 and mouthpiece 110. At the same time, movement of the section 109 and mouthpiece 110 has no detrimental influence upon the sound recorder and reproducer and its carriage, and the section 109 is not extended forwardly and downwardly in front of the record so as to be in the way and interfere with operation of the punch keys or levers 91 and 92, removal of tray 72 or the record, etc. Substantially similar benefits may be obtained in connection with the transcribing machine by having the sound outlet neck of the reproducer project rearwardly for being coupled with the sound tube 112, instead of having the same extend forwardly in front of the record. The sound outlet neck 113 of the reproducer is clearly shown extended rearwardly for this purpose in Figure 25.

Figure 8:
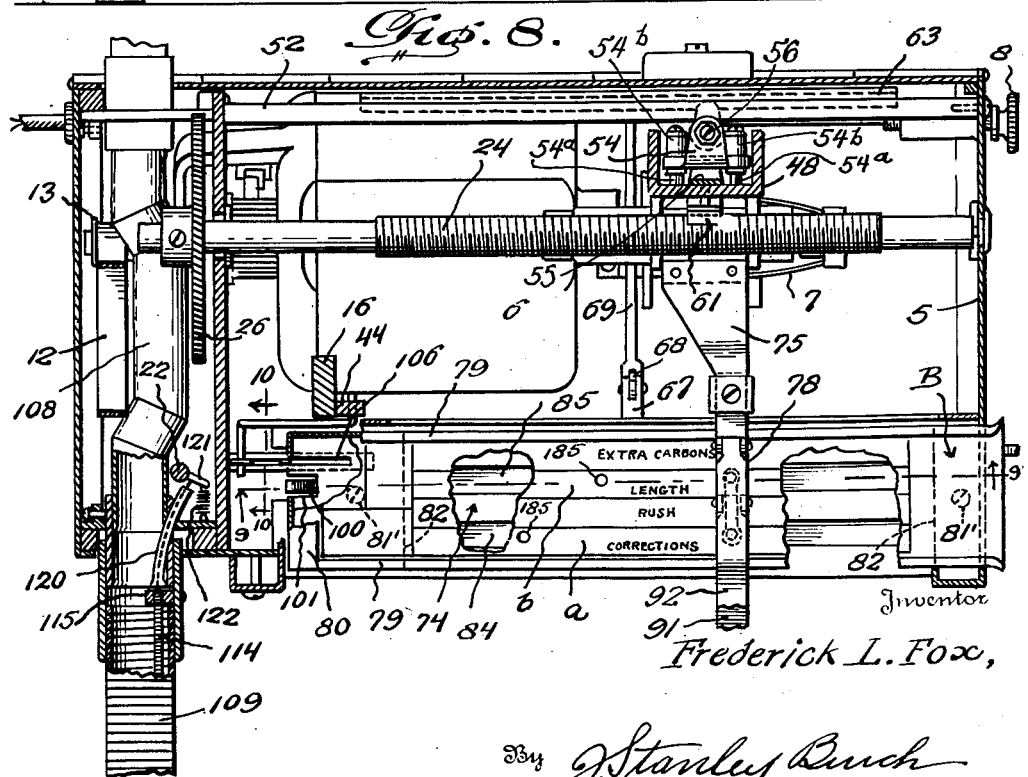
Figure 8 is a horizontal longitudinal section on line 8—8 of Figure 6.

In order that the operator may conveniently control the clutch shifting fork 21 of the dictating machine, the speaker tube section 109 has a Bowden wire element 114 extended therethrough with its ends suitably held in brackets or clamps 115 as clearly shown in Figures 1 and 8, the internal or flexible wire member of which is attached at one end to a lever 116 rigid with the pivoted end of a finger bar 117 constituting the cover of a case 118 attached to the mouthpiece 110. The lever 116 projects freely through a slot in the mouthpiece 110, while a spring 119 is arranged within the case 118 so as to normally force the finger bar 117 outwardly and shift the lever 116 for exerting an outward pull on the wire member of the Bowden wire element 114. The other or inner end of said wire member of element 114 is arranged to project through a guide tube 120 secured in the forward end portion of rigid speaker tube section 108, said wire member terminating in proximity to a lateral arm 121 rigid with the lower end of shaft 22 which carries the clutch shifting fork 21. A spring 122 is connected to arm 121 so as to turn shaft 22 and normally position fork 21 in clutch-releasing position. Thus, upon depression of the finger bar 117 against the action of spring 119, the wire member of Bowden wire element 114 is forced inwardly so as to actuate arm 121 for turning shaft 22 and causing fork 21 to engage clutch 20 with pulley 11, thereby operatively connecting the motor 6 with the record mandrel and with the feed screw 24. The record mandrel and feed screw will be driven as long as the finger bar 117 is held depressed, but said parts will be rendered inoperative by disengagement of clutch member 20 as soon as the finger bar 117 is released. It will thus be seen that the machine is provided with simple and efficient controlling devices all of which are carried directly by the machine and are of such simple construction as to be capable of economical manufacture and to insure against readily getting out of order.

Figure 7:
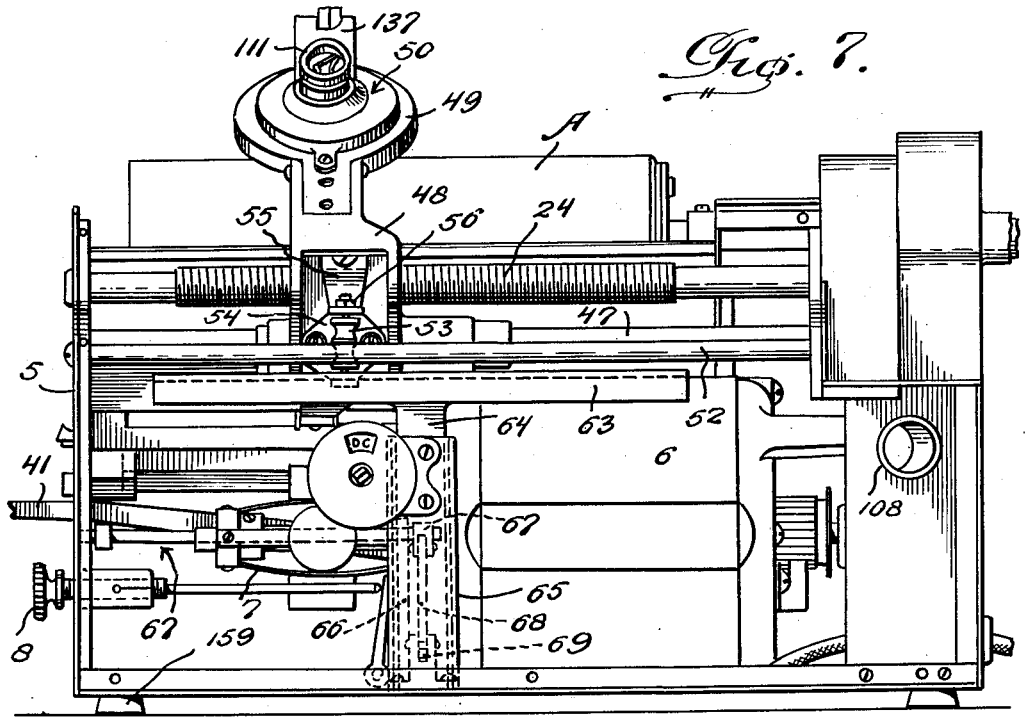
Figure 7 is a view similar to Figure 3 with the rear wall of the casing and the associated section of the speaker tube removed.

The construction of the combined recorder and reproducer employed in connection with the dictating machine is clearly shown in Figures 12 to 19 inclusive, and will be clearly understood from these figures when considered in connection with Figures 1, 6 and 7. Such recorder and reproducer is of a generally well known type in which the body 50 is provided with a projecting front portion 123 fitting in a recess or cut out at the front of the annular portion 49 of the carriage 48. The projecting portion 123 has a depending lug 124 to which is pivoted at 125 a bracket 126 carrying at its inner end a sound box or diaphragm holder 127. Having universal connection with the central apertured portion of diaphragm holder 127 is a tube 128 slidable in the neck 111 of the body 50. The diaphragm 129 carried by holder 127 has a U-shaped member 130 attached thereto which carries a recording stylus 131. Also, pivoted at 125 is an arm 132 to which is pivoted a floating weight 133 on an axis 134 at right angles to the axis 125. Weight 133 is located below the diaphragm carrier 127 and has a central slot in which is pivoted a lever 135 engaged at one end in the U-shaped member 130 and carrying at its other end a reproducing stylus 136. Thus far described, the recorder and reproducer is of old and well known construction and is substantially the same in all essential respects to the type of recorder and reproducer shown in the U. S. patent to N. H. Holland No. 1,420,316 dated June 20, 1922. As shown by this patent, means has been provided for controlling the positions of the styli including a lever-operated device carried by the sound box carriage and mounted on a guide rod for such carriage. In order to greatly simplify this prior construction and to adapt the same carriage for use in connection with either a dictating or a transcribing machine, I have provided means for controlling the positions of the styli mounted directly upon the body of the combined recorder and reproducer so that the latter and said controlling means may be removed from the carriage as a unit or similarly applied thereto. Thus, either a combined recorder and reproducer may be associated with the carriage in constructing a dictating machine as shown in Figure 1, or a simple reproducer may be associated with the carriage in construction a transcribing machine as shown in Figure 25, the same carriage being employed in either instance. As shown, this controlling device may include a housing 137 attached to the front of the body 50 of the combined recorder and reproducer, said housing having a slot 138 in the top thereof through which projects a lever 139 pivoted at 140 within the top of the housing 137 at its lower end. Provided on the lower end of lever 139 are cams 141 and 142 respectively arranged to engage the upper end of rods 143 and 144 slidably mounted at the front of the body 50 and within the lower portion of housing 137. Rods 143 and 144 respectively engage at their lower ends projecting arms 145 and 146 provided on lever 132 and frame 126. Cams 141 and 142 are so arranged that both of them will be disengaged from the rods 143 and 144 when lever 139 is swung to a forward position as shown in Figure 14, thus allowing both the diaphragm carrier 127 and weight 133 to lower to the position shown in said Figure 14 wherein the recording stylus 131 is engaged with the record and the reproducing stylus 136 is disengaged from said record, as in recording dictation. The arrangement is also such that when lever 139 is swung to an intermediate position alined with an upstanding arm 147 on housing 137, cam 142 depresses rod 143 so as to raise weight 133 and with it the diaphragm carrier 127 disposed thereabove. When this is done, both styli are elevated and disengaged from the record, so that the recorder and reproducer are completely inoperative or in neutral condition. Still further, the arrangement is such that when lever 39 is swung to a position rearwardly of arm 147 as shown in Figures 12 and 13, cam 142 is disengaged from rod 143 so as to allow weight 133 to lower, and cam 141 simultaneously lowers rod 144 so as to elevate diaphragm carrier 127. This causes disengagement of recording stylus 131 from the record and engagement of reproducing stylus 136 with the record as shown in said Figures 12 and 13. A suitable means such as spring 148 may be provided to insure retention of lever 139 in any position to which it is swung, the free end of said spring bearing against the pivoted end of lever 139 where the latter has a small lug 149 arranged to be positioned at one side of the free end of spring 148 when lever 139 is in recording position as shown in Figure 14 and at the other side of said spring when lever 139 is in reproducing position as shown in Figures 12 and 13. This enables the operator to readily "feel" the proper position of lever 139 according to the condition in which it is desired to set the recorder and reproducer. Rods 143 and 144 have depending guide pins 150 and 151 slidable in openings of the body 50 for guiding said rods in their sliding movements. It will of course be understood that the annular portion 49 of carriage 48 is adapted to either removably receive the combined recorder and reproducer as in Figure 12 or a reproducer 51 as in Figure 25, said reproducer being of an old and well known type such as that shown in the U. S. patent to N. H. Holland No. 1,207,404 dated December 5, 1916. As usual, suitable screws are preferably provided for detachably securing the recorder and reproducer or the reproducer in the annular portion 49 of carriage 48.

In constructing the transcribing machine of Figure 25, the sound conducting tube 112, which preferably consists in the usual relatively small rubber tube, is used in place of the speaker tube of the dictating machine, said tube 112 being extended direct to the usual ear-phones, not shown. Naturally, in this event, the rigid speaker tube section 108 of the dictating machine is simply omitted, the openings in the front and rear walls of the casing 5 for accommodating the ends of this speaker tube section 108 being suitably closed by means of stoppers or plugs. Naturally, it is impractical to extend through the sound tube 112 of the transcribing machine any parts of a means for actuating the clutch fork 21. Accordingly, the transcribing machine has a special means for controlling said clutch fork consisting of a horizontal shaft 152 journaled longitudinally of and within the casing 5 near the front of the latter, as well as projecting outwardly through the right hand end of the casing. A lever 153 is secured upon the projecting end of shaft 152, and the oppositely projecting arms of this lever are provided with suitable finger buttons or keys 154 and 155.

Figure 9:
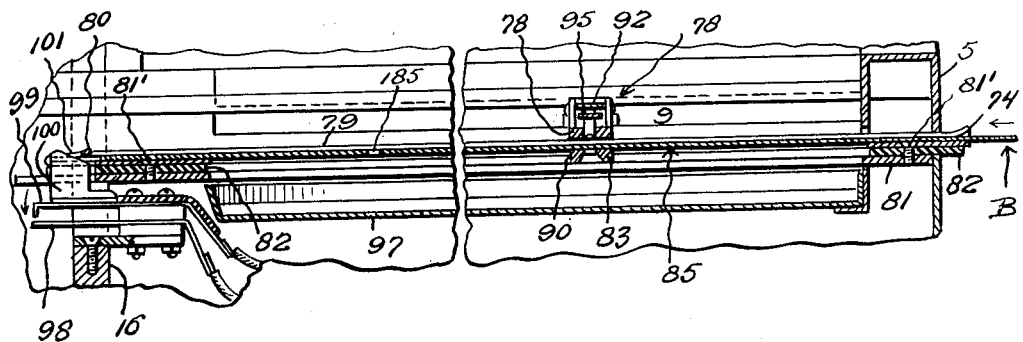
Figure 9 is an enlarged fragmentary longitudinal section on line 9—9 of Figure 8.
Figure 11:
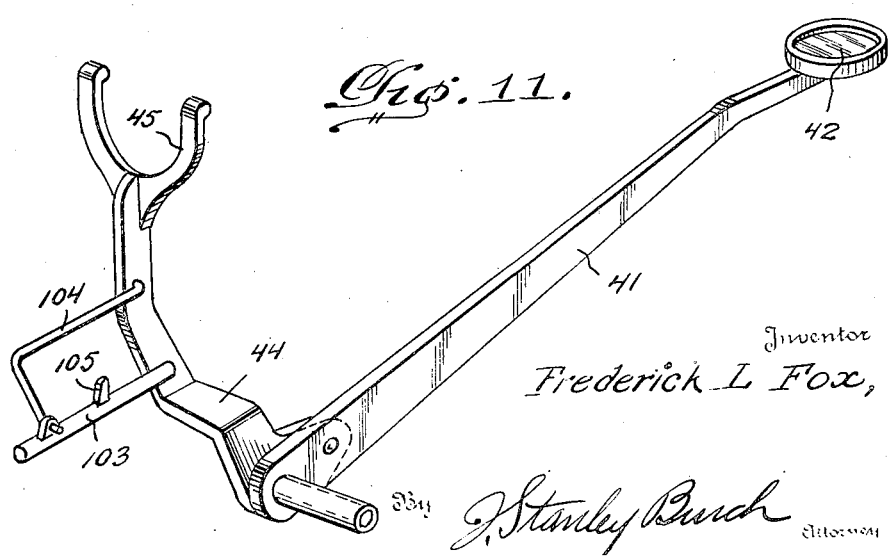
Figure 11 is an enlarged perspective view of the manually operable means for ejecting the memorandum slip and for actuating the record mandrel to eject the record.

In the transcribing machine, the memorandum slip holder 74 is secured upon a fibre or like strip 166 which extends substantially the full width and length of said memorandum slip holder and which is substituted for the short fibre pieces 82 employed in the dictating machine as shown in Figure 9. Carried by the upper surface of the strip 166 and received in the longitudinal slots 84 and 85 of the bottom or plate portion of the memorandum slip holder 74 are elongated conductor strips 167 and 168. These conductor strips are made of copper or some good conductor of electricity, and they extend throughout the length of the slots 84 and 85 as well as being respectively provided with terminals or binding posts, not shown, for facilitating connection of conductor wires thereto. Provided in the front or right hand end of the casing 5 of the transcribing machine are openings provided with differently colored lenses 171 and 172, and arranged within the casing 5 directly behind these lenses are electric lamps 173 and 174. As shown in the diagram of Figure 26, one terminal of lamp 173 is connected by a wire 175 with conductor strip 167, while one terminal of lamp 174 is connected by wire 176 with conductor 168. The other terminals of lamps 173 and 174 are connected by wire 177 with the return side of motor 6. Also, the indicator bar 78 of the transcribing machine is in the form of a contact carrying finger substituted in place of the punching device of the dictating machine, said finger having spaced contacts 178 and 179 arranged to respectively engage the conductor strips 167 and 168 and spring pressed downwardly as well as electrically connected together as at 180. These contacts 178 and 179 are connected by a wire 181 with one terminal of a resistance 182 which cuts down the voltage supplied to said contacts 178 and 179 from the feed line of motor 6, the other or feed terminal of resistance 182 being connected by a wire 183 with the feed side of motor 6. Thus, current of low voltage is utilized for operation of lamps 173 and 174, so as to practically eliminate or minimize danger from shock or from fire through short circuiting. The upper ends of contacts 178 and 179 and the electrical connection 180 therebetween are preferably arranged within a cover 184 secured upon the indicator bar 78. It is also noted that the contacts 178 and 179 are of a size to pass through any holes 185 punched in the memorandum slip by means of the punching device of the dictating machine. Thus, when a punched memorandum slip is properly positioned in the holder 74 of the transcribing machine and the machine is placed in operation, the contact carrying finger or indicator bar 78 is caused to move longitudinally of the memorandum slip at a speed proportional to the travel of the sound box across the record. Whenever either contact 178 or 179 registers with a hole 185 in the memorandum slip, it will pass therethrough and engage the adjacent conducting strip 167 or 168. When contact 178 registers with a hole 185 and passes therethrough into engagement with conductor strip 167, the circuit of lamp 173 will be lighted so as to denote to the operator of the transcribing machine that corrections have been dictated at this portion of the record cylinder. In a like manner, whenever contact 179 registers with a hole 185 in the memorandum slip, it will pass therethrough and engage the conductor strip 168 so as to close the circuit of lamp 174 and denote to the operator the fact that the end of a letter or the like dictated on the cylinder has been reached. Of course, the character of instructions may vary, but these are instructions which are ordinarily employed and which are ordinarily indicated in the particular longitudinal spaces of a memorandum slip as shown. By making the lenses 171 and 172 of different colors, such as red and green respectively, the operator will quickly familiarize herself with them and will instantly know the character of warning being given. As the lenses are directly in front of the operator, she is not likely to fail to notice a warning signal whenever given by lighting of the lamps 173 and 174 behind these lenses. The same means for rendering the motor 6 operative and inoperative, under control of the memorandum slip, as well as the same means for ejection of the memorandum slip, are employed in both the dictating and transcribing machines. The manner of connecting the contacts 98 and 99 in the motor circuit is clearly illustrated in Figure 26, wherein contacts 98 and 99 are interposed in the feed line of motor 6 as well as between the source of current supply and the point of connection of wire 183 with said feed line. In other words, the wire 183 is connected at a point between contact 99 and the feed side of motor 6 so that contacts 98 and 99 control the circuit of lamps 173 and 174 as well as the circuit of motor 6. Thus, contacts 98 and 99 constitute the only switch necessary for taking care of current of relatively high voltage, and these can be so arranged in the casing and insulated as to comply with all safety requirements.

Other than in the particular respects above described, the construction of both the dictating and transcribing machines are substantially identical so that in course of manufacture the particular type of machine desired may be readily decided upon and produced with no change in the parts used for the major portion of the machine.

From the foregoing description, it is believed that the construction and operation as well as the many important features and advantages of the present invention will be readily understood and appreciated by those skilled in the art. It will also be understood that my invention is not limited to the specific embodiments and features of construction shown and described herein, such features and embodiments being subject to changes and modifications without departing from the spirit of the invention as claimed.

What I claim as new is:

1. In a phonograph, a casing, a rotatable record support above the top of said casing, a sound box carriage projecting through the top of said casing at the rear of said record support, means in the rear upper portion of said casing for uniformly progressing said carriage across said record support, a momorandum slip holder mounted at the top of said casing in front of and below said record support, and an indicator bar attached to the carriage and extending forwardly beneath the top of the casing and across the memorandum slip holder.

2. A commercial phonograph of the transcribing machine type, which is adapted to be mounted endwise beside a typewriter, said phonograph embodying a casing, a rotatable record support, a sound box carriage, motor-operated driving means for the record support, controlling means for said driving means including operating keys arranged at the forward end of the casing, a memorandum slip, a holder for said slip on the casing, and signalling means including a signal light controlled in operation by the insertion or removal of said memorandum slip and said signal light being arranged at the forward end of the casing.

3. In a phonograph, a rotatable record support, parallel guide rods mounted one behind the other rearwardly of said record support, a sound box support pivotally and slidably mounted on the forward one of said guide rods for respectively positioning the sound box in operative or inoperative relation to a record on said record support and for permitting progression of the sound box support along said record support, and yieldable means carried by said box support and engaged with the rearward one of said guide rods to relatively retain said sound box support in either of its positions when swung toward or away from the record support.

4. In a phonograph, in combination, a rotatable record support, a record ejector, a holder associated with the support adapted to receive a memorandum slip, and means associated with said record ejector adapted simultaneously to eject a record from said support and a slip from said holder.

5. In a phonograph, in combination, a rotatable record support, a circuit containing an electric driving motor for said record support, a normally open switch in said circuit, a holder adapted to receive a memorandum slip, means adapted to cooperate with a memorandum slip in said holder to close said switch for the energization of said motor, a record ejector, and means associated with said record ejector operable in response to actuation of said ejector for the removal of a cylinder from said record support to eject said slip and open said motor circuit.

FREDERICK L. FOX.